Nov. 10, 1959 — T. N. HULL, JR — 2,912,223
TURBINE BUCKET VIBRATION DAMPENER AND SEALING ASSEMBLY
Filed March 17, 1955
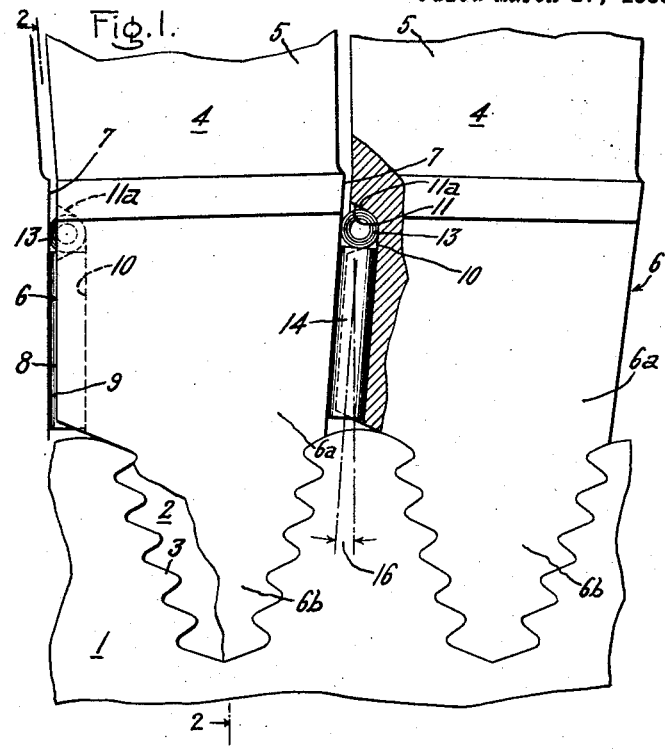
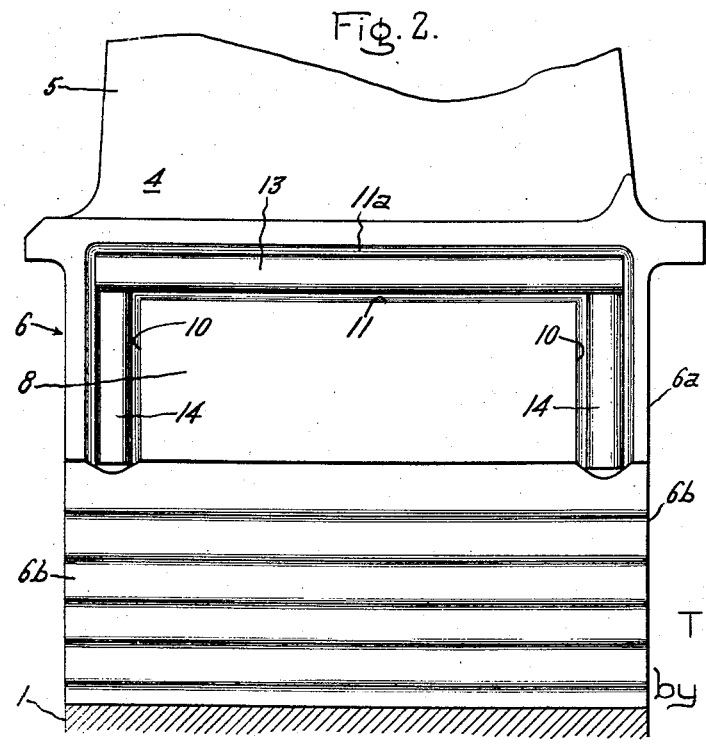
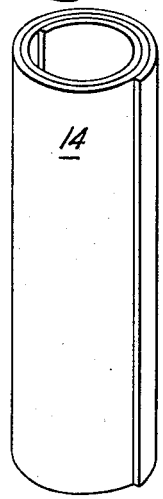
Inventor:
Thomas N. Hull Jr.
by Kiess
His Attorney United States Patent Office 2,912,223
Patented Nov. 10, 1959

2,912,223

TURBINE BUCKET VIBRATION DAMPENER AND SEALING ASSEMBLY

Thomas N. Hull, Jr., Marblehead, Mass., assignor to General Electric Company, a corporation of New York Application March 17, 1955, Serial No. 494,909

5 Claims. (Cl. 253—77)

This invention relates to a turbo-machine rotor assembly, particularly to a turbine bucket assembly used in a rotor subject to large centrifugal forces and changes in temperature.

Steam or gas turbine buckets which are subject to large centrifugal forces set up vibrational stresses. When the turbine buckets are subjected to such stresses at or near the resonant frequency they have a tendency to fracture. Such fractures have occasionally occurred in the very tough and heat stable metal alloys from which turbine blades are constructed.

In addition, the turbine bucket assembly is subject to alternate heating and cooling. These heating and cooling cycles encountered in normal operation cause frequent alternate expansions, contractions, and fatiguing of the turbine buckets so that they frequently crack, occasion delays, renewals, and very considerable expense.

Accordingly, it is an object of this invention to provide a vibration damping means between the turbine buckets to prevent the buildup of vibrational stresses.

A further object is to provide a resilient sealing means in the clearance space between bucket bases which permits free thermal expansion of the buckets while avoiding fluid losses therethrough.

A still further object is to provide a high temperature turbine wheel having the rim portion subdivided into segments which are free to expand and contract circumferentially relative to each other without setting up excessive tension or compression forces in the high temperature rim portion.

Other objects and advantages will be apparent from the specification and claims and the accompanying drawings which illustrate an embodiment of the invention, in which Fig. 1 is a front view partially in section showing a series of buckets mounted on a rotor and provided with damping and sealing means mounted therebetween; Fig. 2 is a section taken along lines 2—2 of Fig. 1, and Fig. 3 is a perspective view of the special spiral seal pin used between the buckets.

Generally stated, the invention is practiced by locating the buckets a slight distance apart on the rotor wheel, to permit the buckets to expand circumferentially in response to temperature changes, and providing resilient damping and sealing members between the bucket bases to reduce the vibrational stresses and prevent the leakage of motive fluid therebetween.

Referring first to Fig. 1, a turbine wheel comprising a disk member 1 is provided with evenly spaced axially extending V-shaped grooves 2 having serrations 3 extending along the sides of the V. Axially inserted into the V-shaped grooves 2 are a series of turbine buckets 4. These turbine buckets include a blade portion 5 and a base portion 6. The base portion consists of a shank portion 6a and a V-shaped dovetail 6b. The dovetail portion 6b is disposed in the grooves 2. While the dovetail type of fastening is illustrated, it is obvious that other types of securing means may be used.

The shank portion 6a has a substantial radial length so that the highly stressed dovetail portion 6b is located a substantial distance inwardly from the blade portion 5. This location places the dovetail connections substantially out of the highest temperature region of the motive fluid flow through the turbine. The bottoms of the grooves 2 and dovetails 6b are disposed within the area encompassed by the cooling systems, which cools the rotor in the conventional manner. In other words, the radial depth of the shank portion 6a is such that it extends radially across the uncooled rim portion of the rotor. Thermal stresses will not, therefore, be set up in sufficient magnitude to cause cracks to form at the bottom of the grooves 2, since substantially the entire surface area of the disk member 1 is subjected to the action of cooling air or some analogous cooling means (not shown).

In normal operation, the buckets tend to vibrate and set up vibrational stresses. If these vibrational stresses are allowed to substantially reach the resonant frequency they have a tendency to fracture the bucket. To prevent this, the novel damping means has been provided.

The damping arrangement essentially consists of a plurality of substantially radially and axially disposed compressible pins in the clearance spaces between the shanks of the buckets. These pins dampen out the vibrations of the buckets by internal friction work in the pins and the frictional contact between the pins and the buckets.

In detail, a bucket 4 is provided with a plurality of grooves 10, 11 (Fig. 2), in the radial surface 8 of the shank portion 6a. These grooves, by way of example only, are substantially semicircular in cross-section. The grooves 10 are located a short distance inward from the opposite ends of radial surface 8 and are disposed slightly "off radial" relative to the disk member 1 (for reasons to be described later).

The groove 11 is transversely disposed and extends between the ends of the grooves 10 adjacent the blade portion 5.

Disposed in the grooves 10, 11, are special "pins" 13, 14, of the type disclosed in Fig. 3, and known to the trade under the brand name "Spirol." These members 13, 14 are spiral wound springs of thin resilient sheet material, forming a substantially cylindrical "pin." The spiral spring action tends to expand the pins to conform to the spaces 9 in which they are located.

The pin 13 is held in close contact with the upper surface 11a of groove 11 and the adjacent shank face 7 by the large centrifugal forces set up during the normal high speed operation of the rotor.

The action of these spiral seal pins will be seen from the following.

A given bucket, vibrating out of phase with its neighbors, causes relative frictional sliding between the shank and the pin surfaces in contact therewith. In addition, out-of-phase vibration in the tangential direction between adjacent buckets causes some expansion and contraction of the space 9 in which the pins are located. This expansion and contraction in a tangential direction causes the pins to expand and contract, producing a friction rubbing between adjacent convolutions of the spiral pin. This friction takes place along substantially the entire contact surface between the convolutions of the pin. Thus, a friction area many times larger than that in actual contact between the outer convolution and the adjacent shank surfaces is available for damping out the bucket vibration to prevent the setting up of undue vibrational stresses.

Now referring to pins 14, it is noted from Fig. 1 that they are disposed slightly "off radial" relative to the rotor. This angle is very small and is shown to an exaggerated extent at 16 in Fig. 1. The angle is actually on the magnitude of around 1° or 2°. With the pins disposed at this angle, a better friction effect is obtained due to the action of centrifugal force forcing the pins against the adjacent shank surfaces.

As previously mentioned, the buckets when subjected to changes in temperature tend to set up large thermal stresses. With the bucket bases in solid contact with each other, these thermal stresses produce high tension and compression forces in the wheel rim which can cause cracking of the buckets and rim. To prevent this, a substantial clearance space 9 is provided between adjacent buckets. This space permits the bases to freely expand and contract in a tangential direction in accordance with the changes in temperature, without setting up thermal stresses.

In order to prevent power fluid from leaking through this generous clearance space 9 and thereby cause a serious loss in the efficiency of operation of the turbine, it is necessary to provide a seal in the space 9. This is accomplished by locating the radial pins 14 so that they perform the dual function of damping out vibration and sealing the space between the buckets. This sealing function of the spiral pins is particularly necessary when a "long shank" bucket is used, and in such a case the radial pins 14 will of course extend substantially the full radial length of the shank portion 6a.

The sealing action of the pins 14 is due to the fact that the pins are spiral springs and will tend to expand to fill the space in which they are located, and will tend to expand or contract with any contraction or expansion of the adjacent buckets.

Thus it will be seen that the invention provides a combination vibration damping and sealing assembly disposed between the long shank portions of the buckets, which damp out vibrational forces, and permit the buckets to expand and contract freely in response to changes in temperature, while preventing the leakage of motive fluid therebetween.

While a single embodiment of the invention has been described in detail herein, it will be obvious to those skilled in the art that many changes and substitutions of equivalents might be made. For example, if desired, there may be additional radial or transversely disposed pins located between the buckets. Also, it not absolutely necessary that the pins 14 be disposed "off radial," since a substantial damping effect takes place due to the tendency of the spiral spring pins to resiliently expand. It is, of course, desired to cover by the appended claims all such modifications as fall within the true spirit and scope of the invention.

What I claim as new and desire to secure by Letters Patent of the United States is:

1. A turbo-machine rotor comprising a disc member, a circumferential row of buckets with base portions secured to the disc, adjoining buckets having shank portions of substantial radial length defining adjacent substantially radial surfaces spaced apart circumferentially to form a substantial clearance space extending axially across the disc, at least one of said adjacent surfaces defining at least one generally axial and at least one radially disposed groove, a compressible pin member disposed in each of said grooves and frictionally engaging adjacent bucket shank surfaces for resisting vibration of the buckets, the radially disposed pin extending substantially the full length of the shank portion to reduce motive fluid leakage through said clearance space.

2. A turbo-machine rotor comprising a disc member, a circumferential row of buckets with base portions secured to the disc, adjoining buckets having shank portions of substantial radial length defining adjacent surfaces spaced apart to form a substantial clearance space extending axially across the disc, at least one of said adjacent surfaces defining at least one axially extending groove and at least one groove disposed slightly "off radial" relative to the disc member, pins in said grooves subject to centrifugal force to cause them to frictionally engage the adjacent bucket surfaces for resisting vibration of the buckets, the substantially radially disposed pin extending substantially the full length of the shank portion to reduce motive fluid leakage through the clearance space between the adjacent shanks.

3. A turbo-machine rotor comprising a disc member, a circumferential row of buckets with base portions secured to the disc, adjoining buckets having shank portions defining adjacent surfaces of substantial radial length which are spaced apart to provide an axially extending clearance space to permit the bucket bases to freely expand tangentially into said clearance space in response to an increase in temperature, at least one of said adjacent surfaces defining at least one axially extending and one radially disposed groove, pin means disposed in the groove and occupying the clearance space between adjacent bucket shanks, the radially disposed pin means extending substantially the full radial length of the bucket shank portion, at least one of said pin means being in the form of a spiral spring having a plurality of spiral convolutions, whereby upon expansion or contraction of the clearance space due to temperature changes or bucket vibration, the spiral pins will expand or contract to dampen out the vibration through friction work between adjacent convolutions and will conform to the space between the shanks to substantially reduce leakage of motive fluid therethrough.

4. A turbo-machine rotor comprising a disc member defining a circumferential row of axially extending V-shaped grooves, a circumferential row of buckets each having a blade portion, a shank portion of substantial radial length, and a V-shaped dovetail portion of substantially the same configuration as said V-shaped grooves and secured therein, the buckets being spaced slightly apart on the disk to define a substantial clearance space between adjacent surfaces of adjoining shank portions to permit tangential expansion thereof, at least one of said adjacent surfaces defining at least one axially extending and at least one radially disposed groove, the latter extending substantially the full length of the shank portion, compressible pins in said grooves occupying the clearance space between the bucket shanks, each pin being in the form of a spiral spring having several convolutions, whereby when tangential vibration of the buckets relative to the disk causes the clearance space between the shanks to increase or diminish in size the spiral springs will expand or contract to dampen out the vibrations by friction work along the surfaces of the convolutions, while the radial pins reduce motive fluid leakage between adjacent shanks.

5. A turbo-machine rotor comprising a disc member, the disc member defining a circumferential row of axially extending V-shaped grooves, a circumferential row of buckets each having a blade portion, a shank portion of substantial radial length, and a V-shaped dovetail of substantially the same configuration as said V-shaped grooves and disposed therein, the buckets being spaced slightly apart to define a substantial clearance space to permit expansion thereof, the adjoining shank portions defining adjacent surfaces, at least one of said adjacent surfaces defining at least one axially extending groove and at least one groove disposed slightly "off radial" relative to the disc member and extending substantially the full radial length of the shank portion, pins in said grooves subject to centrifugal force to cause them to frictionally engage adjacent bucket surfaces for resisting vibration of the buckets, each of the pins in said grooves occupying the clearance space between the bucket shanks and being in the form of a spiral spring having several spiral convolutions, whereby upon expansion or contraction of the clearance space due to temperature changes or bucket vibration the spiral pins will expand or contract to dampen out the vibration through the friction work on the adjacent convolutions and conform to the space between the shanks to prevent the leakage of motive fluid therethrough.

References Cited in the file of this patent

UNITED STATES PATENTS

| 2,310,412 | Flanders | Feb. 9, 1943 |
| 2,405,283 | Birmann | Aug. 6, 1946 |
| 2,646,920 | Butcher | July 28, 1953 |
| 2,664,240 | | |
| 2,669,383 | | |
| 2,664,240 | Gorton | Dec. 29, 1953 |
| 2,669,383 | Purvis | Feb. 16, 1954 |

FOREIGN PATENTS

| 595,643 | Great Britain | Dec. 11, 1947 |
| 667,979 | Great Britain | Mar. 12, 1952 |
| 670,665 | Great Britain | Apr. 23, 1952 |
| 671,960 | Great Britain | May 14, 1952 |